United States Patent [19]

Rundell

[11] 4,140,150
[45] Feb. 20, 1979

[54] DRINKING WATER SUPPLY AND CONDITIONER FOR VEHICLES

[76] Inventor: Clarence M. Rundell, 1124 W. 36th No. Box 8, Wichita, Kans. 67204

[21] Appl. No.: 799,356

[22] Filed: May 23, 1977

[51] Int. Cl.² .............................................. B67D 5/62
[52] U.S. Cl. ................................... 137/340; 137/354; 165/43; 165/154; 222/146 H; 222/146 C; 222/146 R
[58] Field of Search .................... 137/340, 334, 354; 165/42, 43, 154; 222/146 C, 146 H; 62/244, 390, 399

[56] References Cited
U.S. PATENT DOCUMENTS

| | | | |
|---|---|---|---|
| 1,543,449 | 6/1925 | Rust | 165/154 |
| 2,975,797 | 3/1961 | Matheney | 137/334 |
| 3,540,629 | 10/1970 | Ballentine | 222/146 R |
| 3,558,013 | 1/1971 | Ponzo | 222/146 C |
| 3,998,240 | 12/1976 | Liautaud | 137/606 |
| 4,034,571 | 7/1977 | Bollinger | 222/146 C |
| 4,055,279 | 10/1977 | Lopera et al. | 222/626 X |

Primary Examiner—Martin P. Schwadron
Assistant Examiner—A. Michael Chambers
Attorney, Agent, or Firm—Fishburn, Gold & Litman

[57] ABSTRACT

A drinking water supply and conditioner for vehicles comprises a tank mounted in the luggage compartment of the vehicle and connected with hot and cold water heat exchangers attached to the vehicle engine. Each of the heat exchangers has two distinct vessels therein separated by a heat transmitting wall. The inner vessel of the hot water heat exchanger is connected with a hose carrying hot engine cooling fluid therein, such as a heater or radiator hose, and the inner vessel of the cold water heat exchanger is connected with an air conditioning refrigerant line. A faucet is mounted in the passenger area of the vehicle and includes a valve for controlling liquid flow therethrough. Tubing interconnects the tank with each of the heat exchangers and the faucet, and a pump is connected therewith, whereby during vehicle operation, both cold and hot drinking water are supplied to the faucet under pressure for dispensing therefrom.

1 Claim, 6 Drawing Figures

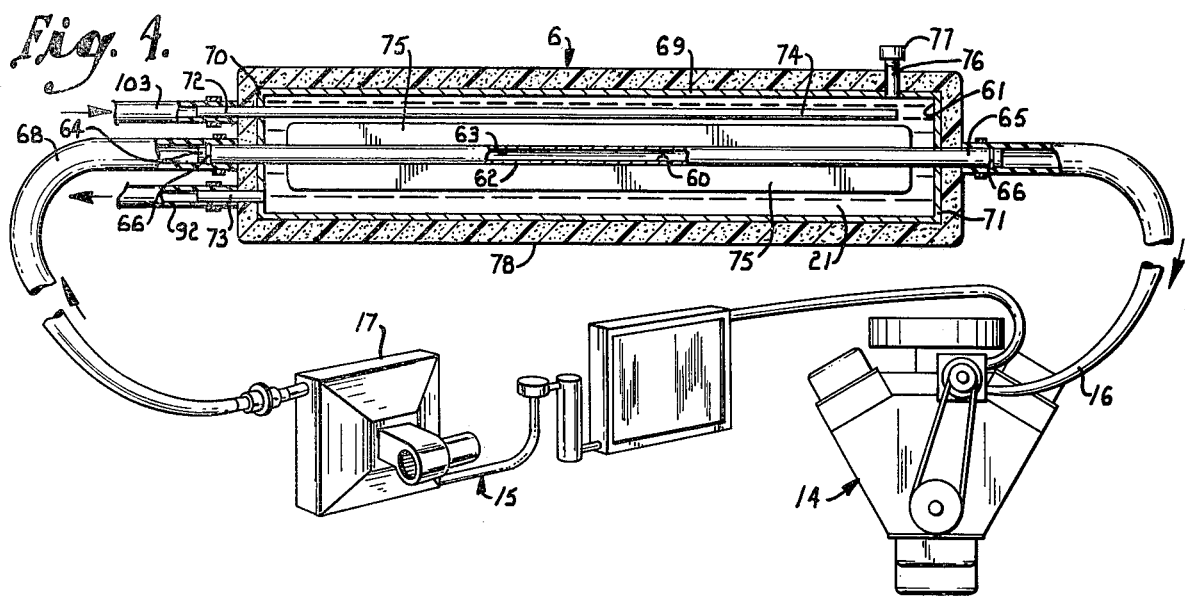
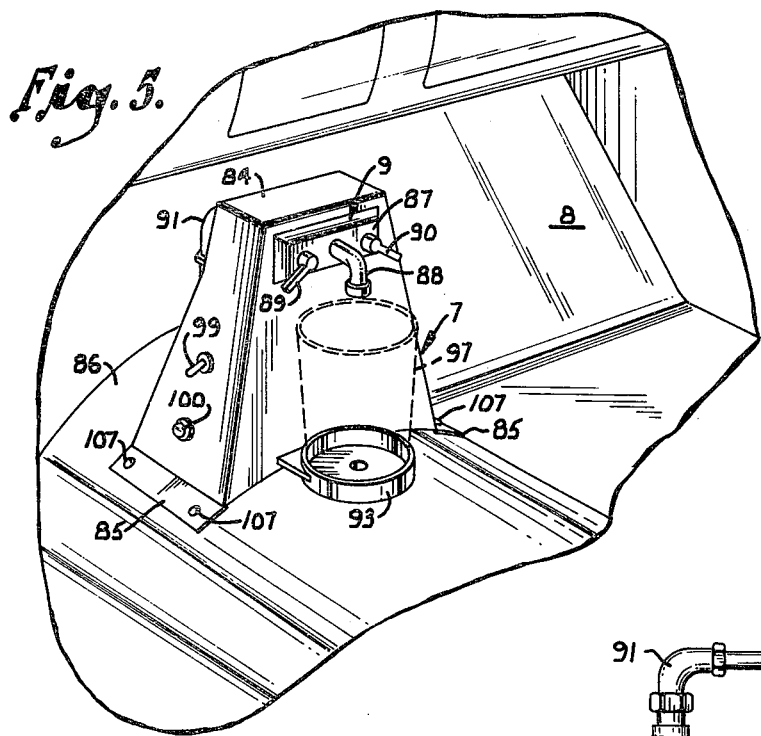
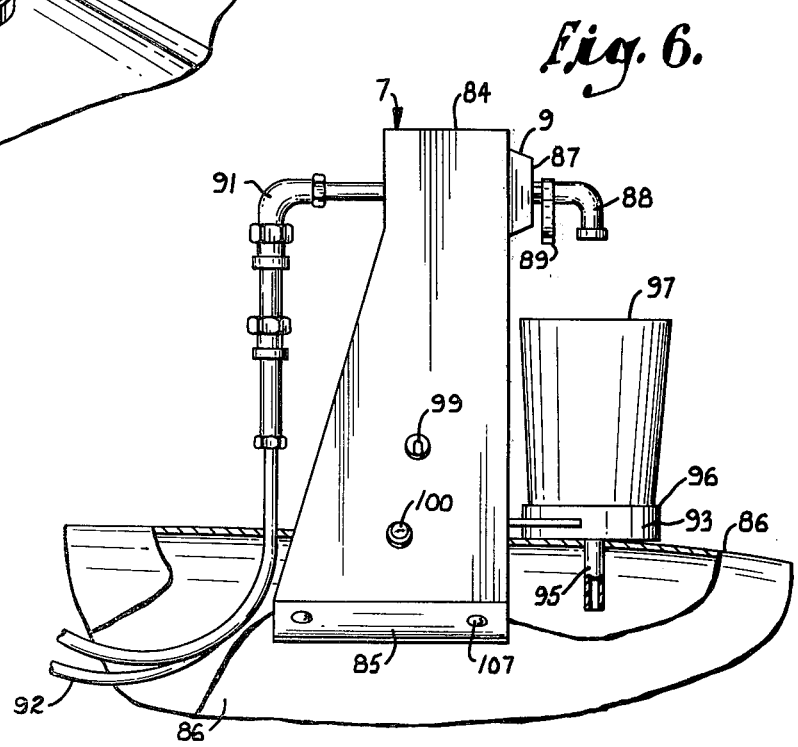

DRINKING WATER SUPPLY AND CONDITIONER FOR VEHICLES

This invention relates to a drinking water supply and conditioner for vehicles, and in particular to a device for supplying both hot and cold drinking water.

The principal objects of the present invention are: to provide a drinking water supply and conditioner for vehicles which dispenses both hot and cold drinking water; to provide such a device having a faucet with a mixing portion for varying the temperature of the water to facilitate a variety of divergent uses thereof; to provide such a device having a spill tray to expel unwanted water from the cab portion of the vehicle; to provide such a device including an electric pump for positive water flow and reliable operation; to provide such a device wherein a cold water heat exchanger is installed in the return side of an air conditioning refrigerant line for efficient and economical operation; to provide such a device wherein each heat exchanger includes a vent tube and mating cap to facilitate filling the drinking water supply system; to provide such a device wherein a single conduit line transmits water from a tank disposed in the luggage area of the vehicle to an engine compartment thereof for inexpensive and easy installation; and to provide such a device which is economical to manufacture, efficient in use, and particularly well adapted for the proposed use.

Other objects and advantages of this invention will become apparent from the following description and the appended claims, taken in connection with the accompanying drawings wherein are set forth, by way of illustration and example, certain embodiments of this invention.

The drawings constitute a part of this specification and include exemplary embodiments of the present invention and illustrate various objects and features thereof.

FIG. 4 is a fragmentary, partially schematic view of the arrangement, particularly showing a cold water heat exchanger having portions thereof broken away.

FIG. 5 is a perspective view of a faucet portion of the drinking water supply and conditioner arrangement shown attached to the floor of the vehicle.

FIG. 6 is a side elevational view of the faucet member.

Figure 1:
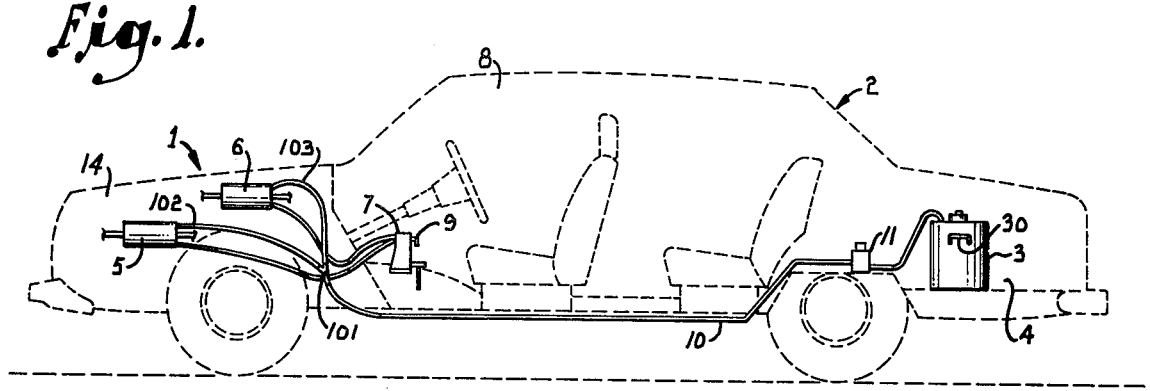
FIG. 1 is a partially schematic, side elevational view of a drinking water supply and conditioner arrangement embodying the present invention, and is shown mounted in a vehicle.

Referring more in detail to the drawings:

The reference numeral 1 generally designates a drinking water supply and conditioner arrangement embodying the present invention for mounting in a vehicle 2. The arrangement 1 comprises a tank 3 mounted in the luggage compartment 4 of the vehicle, and is connected with hot and cold water heat exchangers 5 and 6 respectively. A faucet 7 is mounted in the passenger area 8 of the vehicle and includes a valve 9 for controlling liquid flow therethrough. Tubing 10 interconnects the tank 3 with each of the heat exchangers 5 and 6 respectively and the faucet 7 and a pump 11 is connected with the tubing, whereby during vehicle operation, both cold and hot drinking water is supplied to the faucet under pressure for dispensing therefrom.

The drinking water supply and conditioner system 1 is designed for vehicles having means for producing both super and sub-ambient fluids therein during vehicle operation, and particularly for vehicles having a refrigerating and/or air conditioning system, and being powered by a liquid cooled internal combustion engine. The vehicle 2 may comprise a motor home, truck, farm combine, tractor, offroad heavy equipment, and the like, and in this example is an automobile having a passenger area 8, a luggage compartment 4, and an engine compartment 14. The car 2 is powered by a conventional liquid cooled internal combustion engine, and includes a standard air conditioning system 15 (FIG. 4), having a compressor 16 operably connected with the engine 14, and an evaporator 17 mounted inside the passenger area 8 of the vehicle for cooling the air therein.

Figure 2:
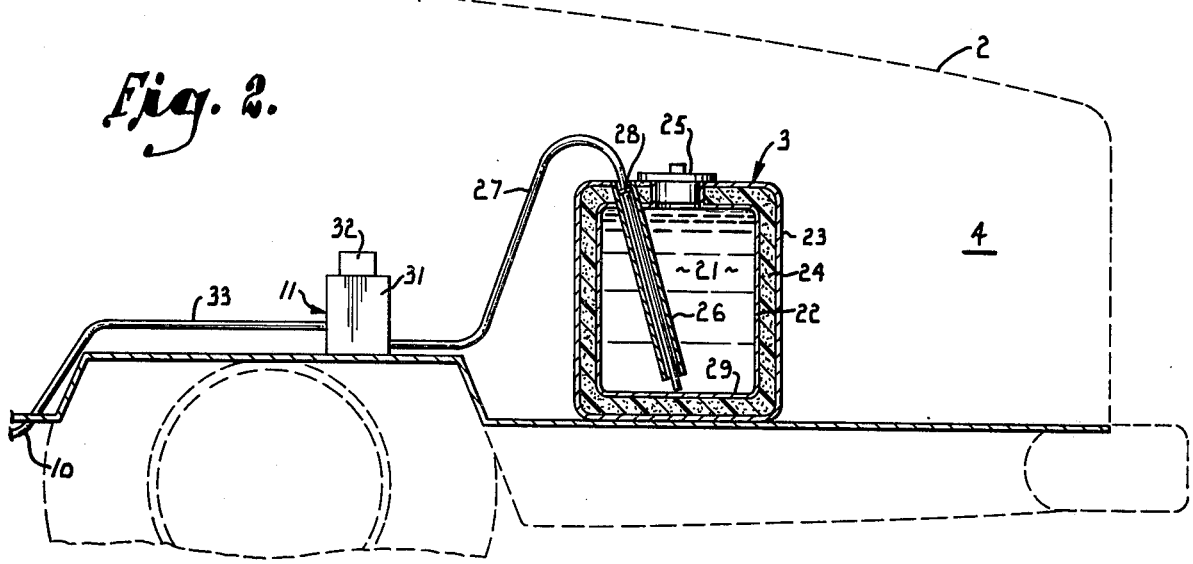
FIG. 2 is a partially schematic view of said arrangement particularly showing a drinking water tank and pump member thereof with portions broken away to show internal construction.

The tank 3 (FIG. 2) is shaped for retaining drinking water 21 therein and is mounted in the vehicle at an out-of-the-way location, such as the luggage compartment 4. In this example, the tank 3 has a double wall construction, wherein an inner side wall 22 is separated from an outer side wall 23 thereof by an air space or insulative material such as foam 24, for improved insulation to assist in preventing the drinking water 21 from freezing during cold weather. The illustrated tank is in the nature of a short milk can having an upper portion provided with a wide mouth or aperture and mating closure cap 25 to provide access to the tank for refilling and cleaning the same. A dispensing tube cover 26 is positioned through aligned apertures in the inner and outer walls 22 and 23 respectively of the tank adjacent the marginal edge thereof, seals thereagainst, and projects downwardly therefrom at an angle toward the center of the tank. A dispensing tube 27 is telescopically and removably received in the cover 26, and includes means such as a snap mechanism 28 to detachably retain the tube in the cover. The dispensing tube 27 is positioned adjacent to the bottom 29 of the tank for complete draining and increased effective tank capacity. The illustrated tank includes a pair of handles 30 mounted to opposing sides of the tank to facilitate removal.

Means are provided for conveying the drinking water in the tank 3 to the faucet 7 under pressure for dispensing therefrom. Any suitable means, such as air pressure, gravity feed, or the like may be used to force the drinking water to flow, and in this example, a positive displacement pump 31 is communicatively attached to the outer end of the dispensing tube 27 at the inlet side thereof, and is powered by an electric motor 32. The motor 32 is connected with the vehicle ignition system, and a pressure sensing switch (not shown) may be included in the circuit for automatically activating the motor in response to a pressure drop in the tubing 10. A segment of conduit or tubing 33 is attached to the pump outlet and conveys the drinking water to both the hot and cold water heat exchangers 5 and 6.

Figure 3:
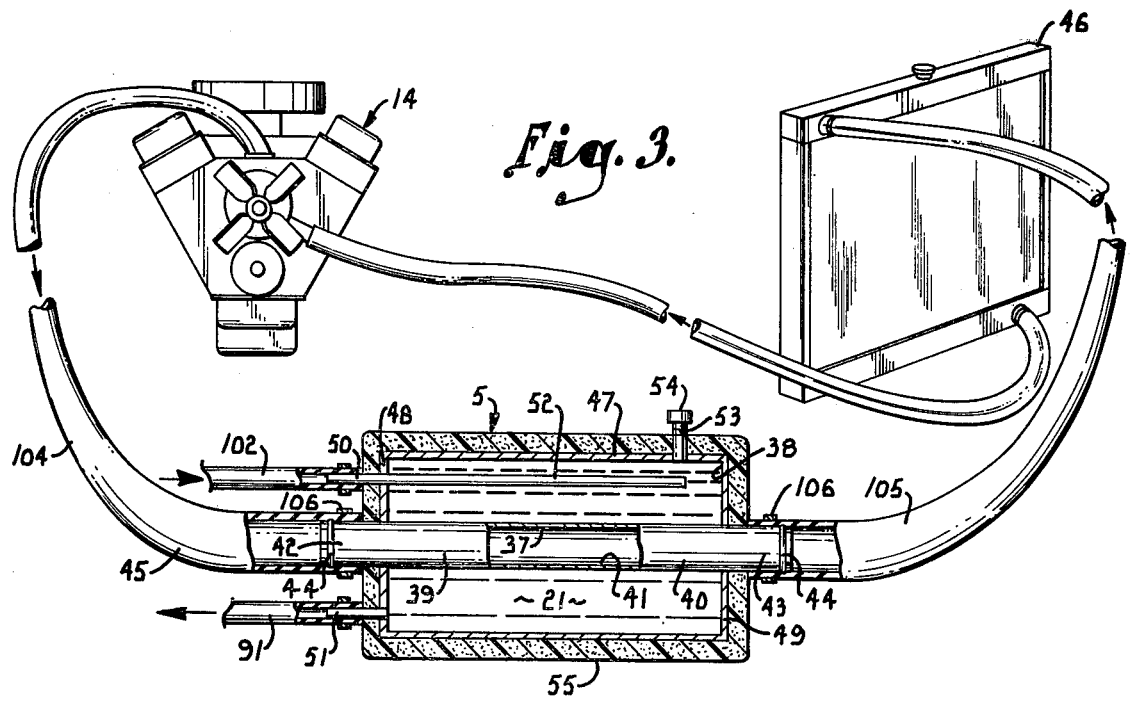
FIG. 3 is a fragmentary, partially schematic view of the arrangement, particularly showing a hot water heat exchanger with portions thereof broken away.

The hot water heat exchanger 5 (FIG. 3) comprises first and second vessels 37 and 38 respectively, separated by a heat transmitting, imperforate wall 39. The illustrated heat exchanger 5 includes an inner tube 40 having an axial aperture 41 therethrough and opposed ends 42 and 43 adapted for connection with an engine coolant hose, such as a heater or radiator hose. In this example, each of the inner tube ends 42 and 43 are provided with an outwardly projecting circumferential rim 44, and are connected with a cooling line segment 45 which returns the engine coolant from the engine 14 to the radiator 46 for cooling therein. An outer heat exchanger tube 47 encases a medial portion of the inner tube 40 and forms the second vessel 38 therebetween. In this example both the inner and outer tubes 40 and 47 have a cylindrical shape and are disposed in a coaxially relationship. The outer tube 47 is provided with a pair of end walls 48 and 49 which seal against the inner tube 40 and form a watertight structure. Inlet and outlet passageways 50 and 51 respectively are disposed in the same end of the outer tube 47 and provide means for circulating drinking water through the second heat exchanger vessel 38. An elongate tube 52 is attached to and communicates with the inlet passageway 50 and extends through the heat exchanger second vessel 38 to a point disposed adjacent to the outer tube end wall 49 for improved heating performance. Also, a vent tube 53 having a threaded upper end and a mating closure cap 54 are attached to the outer tube 47 and communicate with the second vessel 38 to facilitate evacuating trapped air from the second vessel. The inner tube 40 is preferably constructed of a non-corroding, heat conductive material such as copper, and the outer tube is similarly non-corroding, and as illustrated in FIG. 3, is covered by a layer of insulation 55. The lines from the heat exchangers to the faucet may also be insulated. The size of the heat exchanger is commensurate with the requirements of the user and vehicle operating conditions. An outer tube size of 3 inches diameter, inner tube of 1 inch diameter, and length of 6 inches has been found to be satisfactory for general applications.

The cold water heat exchanger 6 (FIG. 4) is somewhat similar in construction to the hot water heat exchanger 5 and comprises first and second vessels 60 and 61 separated by a heat transmitting wall 62. The cold water heat exchanger 6 includes an inner tube defined by wall 62, having a central aperture 63, opposed ends 64 and 65 respectively. Each inner tube end 64 and 65 has a projecting rim 66 thereon. The outer tubes 64 and 65 of the innter tube 66 are connected with a refrigerant line, and in this example communicate with the return line 68 of a conventional air conditioning unit 15. An outer tube 69 encases the inner tube 62 of the cold water heat exchanger and forms the second vessel 61 thereinbetween. The illustrated outer tube 69 and inner tube 62 each have a cylindrical shape and are disposed coaxially, with end walls 70 and 71 interconnecting the inner and outer tubes. Inlet and outlet passageways 72 and 73 respectively communicate with the heat exchanger second vessel 61, and an elongate tube 74 is attached to the inlet passageway for improved cooling performance. Both the inlet and outlet passageways 72 and 73 are positioned on the same end 70 of the second vessel for plumbing ease. The cold water heat exchanger includes a plurality of ribs or fins 75 attached to the inner tube 62, which are spaced about the circumference thereof, and project radially into the second vessel 61 for improved cooling efficiency. The illustrated cold water heat exchanger includes a vent tube 76 and mating closure cap 77, and is covered by a layer of insulation 78 to prevent heat loss therefrom. An outer tube size of 2 inches diameter, inner tube diameter of ⅝ inches, and length of 18 inches has been found to be adequate for the average application.

A liquid dispensing faucet 7 (FIG. 5) is adapted for mounting in the passenger area 8 of the vehicle, and includes valve means 9 for controlling fluid flow therethrough. The illustrated faucet 7 comprises a bracket or body 84 having a pair of flanges 85 for attaching the same to the floor board 86 of the vehicle, and includes a mixing portion 87 for intermingling hot and cold water and varying the temperature thereof. The mixing portion 87 of the faucet comprises a centrally disposed spigot member 88 and a pair of manually operated valves 89 and 90 attached to and communicating with the hot and cold water lines 91 and 92 respectively. A spill tray 93 is attached to the faucet bracket 84 and includes a drain aperture and line 95 extending through the floor board 86 to expel or drain unwanted drinking water from the passenger area. The spill tray 93 also includes an upstanding side wall 96 which forms a recess adapted for receiving and frictionally retaining a cup 97 therein. In this example, an electric switch 99 is mounted on the faucet bracket 84, preferably on the driver's side thereof, and is electrically connected with the pump motor 32 and selectively activates the same. An indicator light 100 is similarly mounted on the driver's side of the faucet bracket and is electrically connected with the switch and the pump motor such that the same is illuminated when the pump motor is operating.

The drinking water supply and conditioner device is easily installed in any conventionally designed vehicle. A system 1 is installed in the illustrated automobile by first mounting the tank 3 securely in the luggage compartment 4 of the automobile. The pump 31 is then attached to the dispensing tube 27 of the tank, and the supply tube 33 is attached to the outlet side of the pump and tubing 10 extended along the exterior surface of the floor board and attached thereto. The dispensing tube 27 is then inserted into the cover 26 with the end of the tube positioned adjacent the bottom of the tank. Because the drinking water is not conditioned until the same reaches the engine compartment of the vehicle, when the conditioner is used in very warm climates, the tubing 10 can be attached to the outside of the vehicle, and need not be insulated. For general use however, the tank, the pump, and each segment of tubing is preferably insulated to prevent freezing of the drinking water. The other end of the tube 10 branches at a Y-portion 101 (FIG. 1) thereof into separate tubing segments 102 and 103, each of which is in turn attached to the hot and the cold water heat exchangers 5 and 6 respectively. The pump motor 32 is electrically connected through switch 99 and light 100 with the electrical system of the automobile, and is preferably wired in a circuit which opens automatically when the vehicle ignition is turned off. The coolant return hose, preferably the upper radiator hose, is then severed at a medial portion thereof, and a length comensurate with the length of the hot water heat exchanger may be cut therefrom leaving segments 104 and 105 (FIG. 3) respectively connected with the vehicle engine 14 and radiator 46. The free ends of hosing segments 104 and 105 are then connected with the ends 42 and 43 respectively of the heat exchanger inner tube 40 by means such as hose clamps 106. The hot water heat exchanger 5 is generally supported by the radiator hose 45, but may also be attached to the vehicle for additional support. In a similar manner, the return line of the refrigerant or air conditioning system, which typically contains a refrigerant gas such as Freon therein, in severed at a medial portion thereof and the opposed ends of the cold water heat exchanger 6 are connected with the free ends of the refrigerant line. The cooling system is then recharged with refrigerant gas. The faucet bracket 84 (FIG. 5) is mounted in the passenger area of the vehicle, and is preferably positioned in the forward portion of the cab adjacent to the driver's seat. Fasteners such as sheet metal screws 107 securely attach the bracket to the vehicle floor board 86. A drain aperture is drilled through the floor board and the drain line 95 is inserted therethrough. The free ends of the hot water line 91 are communicatively connected with the outlet passageway 51 of the water heat exchanger, and the hot water valve 89 respectively, and the cold water line 92 is similarly attached to the cold water heat exchanger outlet 73 and the cold water valve 90. The tank 3 is then filled with sanitary drinking water, and the vent caps 54 and 77 of each heat exchanger are removed, and the pump is operated to pump water through the system, purging the air from the lines and second vessel of each of the heat exchangers.

In operation, the engine circulates hot cooling fluid through the radiator hose 45 (FIG. 3) thereby heating the tube side wall 37 and the drinking water contained in the second vessel 38. Similarly, operation of the vehicle's air conditioner, pumps cold refrigerant gases through refrigerant lines 68 (FIG. 4) thereby cooling the inner tube 62 and the drinking water surrounding the same. To obtain a drink, the user simply manipulates the electrical switch 99 to the "ON" position thereby initiating operation of the motor 32 and pump 31. Water pressure is thereby applied through the supply tube 10 to each of the heat exchangers. By opening valve 90, water is forced through the cold water heat exchanger and faucet for collection in the drinking cup 97. The cold water may be consumed directly from the cup by the user, and/or instant ingredients added thereto for preparing flavored, cold drinks such as lemonade, tea and the like. In a similar manner, manipulation of valve 89 provides the user with hot water, which may be mixed with instant preparations such as coffee, soup, or the like. The cold and hot water may be mixed by selective rotation of each of the valves 89 and 90, thereby adjusting the temperature of the drinking water for a further variety of uses, such as washing. Removal of the cup 97 exposes the spill tray 93 and provides a receptical for draining unwanted water from the vehicle passenger compartment.

It is to be understood that while I have illustrated and described certain forms of my invention, it is not to be limited to the specific forms or arrangement of parts herein described and shown.

I claim:

1. In a vehicle having means for producing super and sub-ambient temperature fluids therein during vehicle operation, a drinking water supply and conditioner therefor comprising:
    (a) a tank mounted in said vehicle and shaped for retaining drinking water therein;
    (b) first and second heat exchangers connected with said vehicle; said heat exchangers each being rigid and having first and second vessels separated by an inner tube having opposing ends and a centrally disposed heat transmitting wall; the inner tube of said first heat exchanger having the opposing ends thereof spliced into and sealingly clamped onto an engine hose through which said super-ambient temperature fluid flows, and the inner tube of said second heat exchanger having the opposing ends thereof spliced into and sealingly clamped onto an air conditioning line through which said sub-ambient temperature fluid flows;
    (c) a liquid dispensing and mixing faucet mounted in a passenger area of said vehicle, and including a spigot connected inbetween first and second independently variable valves for controlling the speed and temperature of fluid flow through said faucet;
    (d) conduit means having a first segment thereof communicatively interconnecting said tank, the second vessel of said first heat exchanger, and said faucet first valve; and a second segment thereof communicatively interconnecting said tank, the second vessel of said second heat exchanger, and said faucet second valve;
    (e) means conveying the drinking water in said tank through said conduit means, whereby during vehicle operation hot and cold drinking water is supplied to said faucet first and second valve respectively under pressure for selective dispensing the drinking water from said spigot and varying the temperature thereof; and wherein
    (f) said second heat exchanger includes:
        (1) an inlet and an outlet passageway communicating with the second vessel of said second heat exchanger, and each positioned at one end thereof;
        (2) an elongate tube disposed within said second heat exchanger second vessel and having a first end thereof connected with said inlet passageway and a second end thereof disposed adjacent the other end of said second vessel for efficient heat transfer; and
        (3) a plurality of axially oriented heat conducting ribs connected to and projecting radially from said second heat exchanger inner tube.

* * * * *